(12) United States Patent
Wang et al.

(10) Patent No.: US 7,769,815 B2
(45) Date of Patent: Aug. 3, 2010

(54) SYSTEM AND METHOD FOR DETERMINING THAT AN EMAIL MESSAGE IS SPAM BASED ON A COMPARISON WITH OTHER POTENTIAL SPAM MESSAGES

(75) Inventors: Tak Yin Wang, Los Altos, CA (US); Patrick Wong, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 147 days.

(21) Appl. No.: 12/132,777

(22) Filed: Jun. 4, 2008

(65) Prior Publication Data

US 2009/0307313 A1 Dec. 10, 2009

(51) Int. Cl.
*G06F 15/16* (2006.01)
(52) U.S. Cl. .................... 709/206; 709/202; 709/203
(58) Field of Classification Search ......... 709/202–203, 709/206–207
See application file for complete search history.

(56) References Cited

U.S. PATENT DOCUMENTS

| 7,181,764 B2 * | 2/2007 | Zhu et al. ................ 726/4 |
|---|---|---|
| 7,287,060 B1 * | 10/2007 | McCown et al. ............ 709/206 |
| 7,389,413 B2 * | 6/2008 | Bandini et al. ............. 713/153 |
| 7,428,579 B2 * | 9/2008 | Libbey et al. .............. 709/206 |
| 7,617,285 B1 * | 11/2009 | Hartmann .................. 709/206 |
| 7,636,716 B1 * | 12/2009 | Cheng .............................. 1/1 |
| 7,680,890 B1 * | 3/2010 | Lin ........................... 709/206 |
| 2006/0168006 A1 * | 7/2006 | Shannon et al. ............ 709/206 |

\* cited by examiner

*Primary Examiner*—Bharat N Barot
(74) *Attorney, Agent, or Firm*—James J. DeCarlo; Greenberg Traurig, LLP

(57) ABSTRACT

The disclosure describes systems and methods for determining spam. A spam detecting system identifies potential spam messages by checking the relationship between a sender of a message and a recipient of the message. The spam detecting system identifies the relationship between the sender and recipient as 'unknown' or 'trusted'. If the message is 'trusted', the message is transmitted accordingly to the recipient. If the message is classified as 'unknown', then the message is analyzed in view of other identified potential spam messages where a count is tallied against a threshold value to keep track of the probability a message is spam.

40 Claims, 7 Drawing Sheets

SYSTEM AND METHOD FOR DETERMINING THAT AN EMAIL MESSAGE IS SPAM BASED ON A COMPARISON WITH OTHER POTENTIAL SPAM MESSAGES

BACKGROUND

Currently, there are anti-spam systems that are incorporated in and with email systems and programs. These anti-spam systems analyze the frequency and volume of inbound emails in order to distinguish spam emails and senders from valid ones. The systems generally prevent email spam by utilizing various known anti-spam techniques. These techniques are typically embedded in products, services and software of email systems. However, these techniques are not a complete solution to the ever-present and rising problems associated with spam emails.

Known techniques include actions performed by users of the email systems, programs implemented by an email administrator, and any other service that monitors email to prevent not only spam, but phishing and identify theft. Each of these techniques have their trade-offs in terms of ineffectiveness, e.g. high cost, high usage of system resources, incorrectly rejecting legitimate emails, not rejecting all spam, and other drawbacks.

SUMMARY

The present disclosure solves problems and ineffectiveness in relation to spam detection and email filtering. The present disclosure provides systems and methods for identifying spam mail by checking a relationship between a sender and a recipient of an email, and determining if the sender falls within a category of either "trusted" or "unknown". According to the first aspect of the disclosure, a method including receiving in a messaging application an electronic message from a sender, the message comprising a message body and a sender address, the message identifying a recipient; identifying the recipient as having a trusted account with a service provider, the account being identified in a trusted database, the account identifying a plurality of sender addresses as being trusted; determining whether the sender address is a trusted sender address by determining if the sender address is identified as trusted in the recipient's trusted account; upon the determination that the sender address is not identified as a trusted sender, identifying the message as potential spam; comparing the message body of the message with a message body of each of a corpus of existing messages in the database that are identified as potential spam; determining if a match exists between the message body of the message and at least one message body of the existing messages; if a match exists, incrementing a message body match counter, the message counter tallying a total number of determined matches; comparing the counter's value with a predetermined threshold value, the predetermined threshold value indicating a probability of a message being spam; and identifying the message as spam based on the comparison.

In an embodiment of the disclosure, a method includes identifying a user from a plurality of users, the plurality of users running a messaging application, the plurality of users all having a mailbox; determining if the user's mailbox satisfies a selection criteria, the selection criteria identifying required activity of the user's mailbox, the selection criteria comprises: determining whether the mailbox has been active for at least a predetermined time period; determining whether the mailbox comprises at least a predetermined number of messages; and determining whether the messages comprise a number of unique senders being within a predetermined range, the predetermined range being a portion of the number of messages; and creating a trusted account for the user's mailbox; and storing the account in a trusted database based upon the user's mailbox satisfying all the selection criteria requirements.

Another aspect of the disclosure is a computer-readable medium tangibly encoded with instructions to perform a method including receiving in a messaging application an electronic message from a sender, the message comprising a message body and a sender address, the message identifying a recipient; identifying the recipient as having a trusted account with a service provider, the account being identified in a trusted database, the account identifying a plurality of sender addresses as being trusted; determining whether the sender address is a trusted sender address by determining if the sender address is identified as trusted in the recipient's trusted account; upon the determination that the sender address is not identified as a trusted sender, identifying the message as potential spam; comparing the message body of the message with a message body of each of a corpus of existing messages in the database that are identified as potential spam; determining if a match exists between the message body of the message and at least one message body of the existing messages; if a match exists, incrementing a message body match counter, the message counter tallying a total number of determined matches; comparing the counter's value with a predetermined threshold value, the predetermined threshold value indicating a probability of a message being spam; and identifying the message as spam based on the comparison.

Yet another aspect of the disclosure is a system including a plurality of processors; a server for receiving an electronic message from a sender, the message comprising a message body and a sender address, the message identifying a recipient; a selection engine implemented on one of the plurality of processors for identifying the recipient as having a trusted account identified in a trusted database, the account identifying a plurality of sender addresses as being trusted; a determination engine implemented on one of the plurality of processors for determining whether the sender address is an identified trusted sender address in the recipient's trusted account, wherein if the sender address is not identified as a trusted sender, the message is identified as potential spam; the determination engine configured for comparing the message body of the message with a message body of each of a corpus of existing messages in the database that are identified as potential spam, wherein if a match exists between the message body of the message and at least one message body of the existing messages, a message body match counter is incremented; the determination engine configured for comparing the counter's value with a predetermined threshold value, the predetermined threshold value indicating a probability of a message being spam; and the determination engine configured for identifying the message as spam based on the comparison.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the disclosure as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

Figure 1:
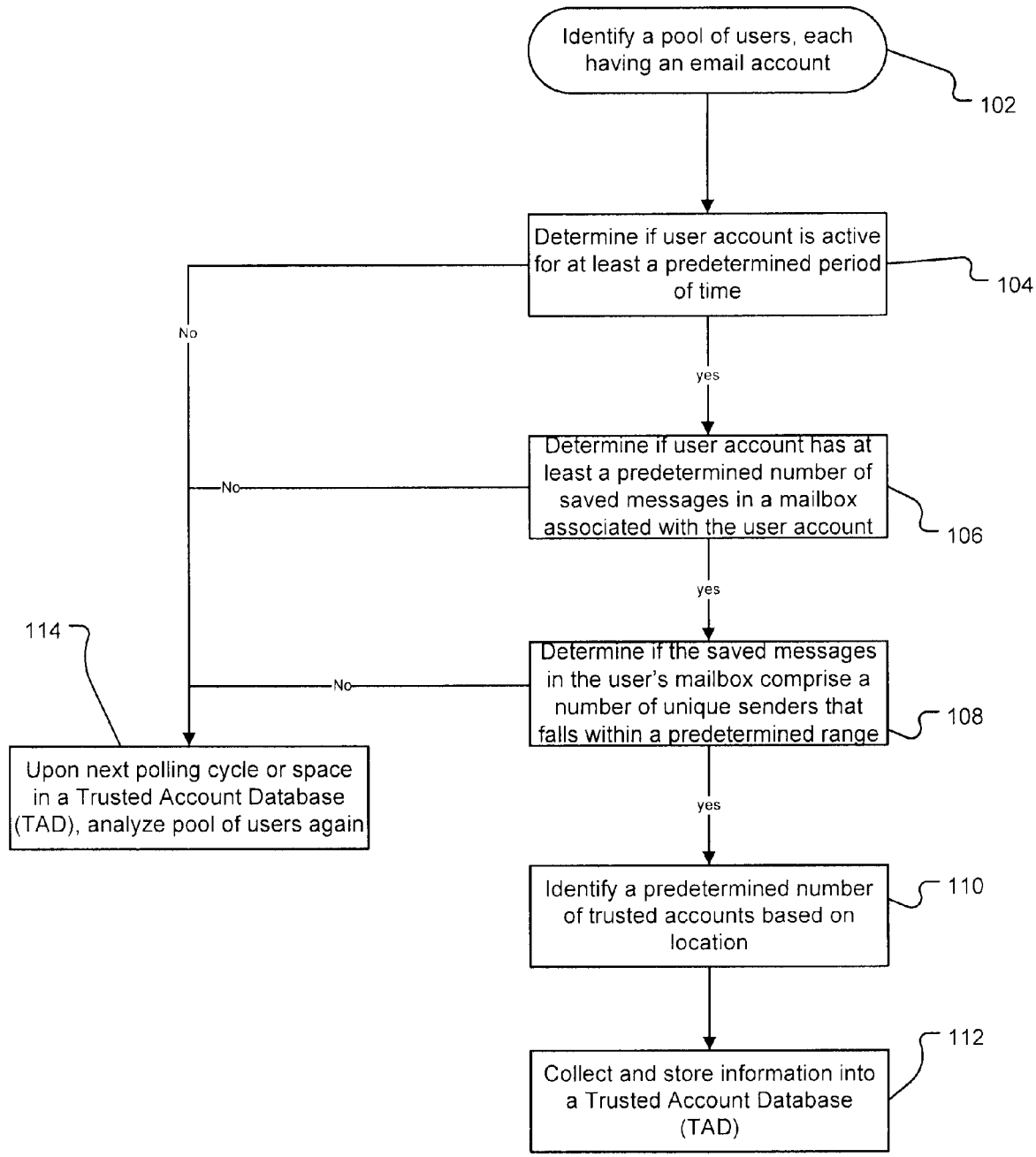
FIG. 1 depicts a flowchart representing an embodiment for identifying users that are eligible for detection of spam.

Reference will now be made in detail to embodiments of the spam detection systems and methods, examples of which are illustrated in the accompanying drawings.

For the purposes of this disclosure, a computing device (also referred to herein as a "computer") includes a processor and memory for storing and executing program code, data and software. Computing devices may be provided with operating systems that allow the execution of software applications in order to manipulate data. Personal computers, PDAs, wireless devices, cell phones, internet appliances, media players, home theater systems, and media centers are several non-limiting examples of computing devices.

For the purposes of this disclosure, a server comprises software and/or hardware running on one or more computing devices which receives information requests from other servers, user computers, or other computing devices, and responds to such requests. A number of program modules and data files may be stored on a computer readable medium of the server. They may include an operating system suitable for controlling the operation of a networked server computer, such as the WINDOWS VISTA, WINDOWS XP, or WINDOWS 2003 operating systems published by Microsoft Corporation of Redmond, Wash., the Ubuntu operating system distributed by Canonical Ldt. of Douglas, Isle of Mann.

For the purposes of this disclosure a computer readable medium stores computer data in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to store the desired information and which can be accessed by the computer.

This disclosure describes techniques utilized within email systems (e.g., Yahoo! Mail, MS Outlook, etc.) to identify incoming email messages as spam by analyzing the sender of the message to determine if the sender can be classified as "unknown" or "trusted" prior to acceptance of the message. Upon the determination of the type of sender, the present disclosure teaches methods of filtering the messages for transmittal to the recipients mailbox. As understood by those of ordinary skill in the art, the spam detecting system may be implemented with any known network that permits and/or facilitates the sending and delivery of email messages. For some embodiments, the spam detecting system may also be implemented for detecting and filtering text messages, for example SMS or chat messages, or other types of data message, in the same manner described herein for the email embodiments.

The spam detecting system may be implemented in one or more network servers for use prior to message delivery. When a message is sent from a sender to the server, the server system determines if the sender is trusted. The server determines whether the sender's email address is present in the address book of a recipient or saved in a recipient's trusted recipient folder/file in a database, in some embodiments described herein as a trusted account database or TAD. The database may be local to the server, or in some embodiments, external from the server. Types of servers implemented within this disclosure will be understood by those in the art as an exchange server, or any type of device that facilitates transmission of data over a network. In some embodiments, the system may be implemented on the recipient's computer device running an email program. For these embodiments, the messages may be filtered prior to downloading the message content. It will be understood by those in the art, that the spam detecting system and method may be implemented on any device that permits message delivery and reception (e.g., PDA, cellular phone, Blackberry, PC, MAC, etc.). Furthermore, the system may comprise a mass storage device (e.g., database) including some form of computer-readable media and provides non-volatile storage of data and software for retrieval and later use by one or more computing devices.

With initial reference to FIG. 1, a method of one embodiment is described hereinbelow. Initially, a pool or corpus of users, each having a user account in an email system, is identified, in step 102. The users may act as both senders and recipients of messages. After the pool of users is identified, the system determines which accounts of the pool can be considered a trusted account in accordance with criteria discussed further hereinbelow. In some embodiments, the trusted account is stored in the database as a set folder(s), file(s), or table(s). The system analyzes each user account, or a group or number of user accounts in a chosen pool, by way of a non-limiting example, based on the following requirements to determine which users' accounts may be deemed a trusted account.

A trusted account determination represents an indication that the user maintains an email account responsibly. The system analyzes a user's email account (also referred to herein interchangeably as mailbox or mail application) to determine if the email account has been active for a predetermined period of time ('x'), in step 104. The predetermined period of time may be a minimum number of years, weeks, or any other measure of time as a matter of application specific to design choice. In some embodiments, the predetermined period of time may be set by the email system or system administrator depending on the number of users in the user pool. For example, a user that logs in to the system regularly and/or receives and saves messages regularly for at least the predetermined period of time. The number of years may be determined based upon the quantity of emails that the user receives or has in his mailbox.

If a user's mailbox has been active for at least the minimum time period, the system will then analyze the messages in the mailbox. The system determines if the user's mailbox has at least a predetermined number of messages ('y') present in their mailbox, step 106, by counting the number of messages present in the user's mailbox. The predetermined number of messages ('y') are then compared to a predetermined message amount threshold by the system. The predetermined threshold can be set by the system, user or administrator of the email system. The threshold reflects a level of security desired. The predetermined number is initially set based upon activity of the entire system in terms of email traffic and optionally is adjusted automatically or through human intervention, over time. If the mailbox contains a number of messages that is less than the threshold, then the mailbox is disqualified for use of the system. If the user's mailbox contains at least the threshold, the system then analyzes the messages present in the user's mailbox to identify the email address of each sender. Each of the sender's email addresses in the user's mailbox are analyzed to identify a number of unique senders present in the mailbox being analyzed. A unique sender can be identified from a user's mailbox as a sender whose messages have been designated as safe, (by way of non-limiting example, a sender's email address is present in a user mailbox address book, or there exists an established relationship where messages have been previously transmitted and received, or by the mailbox owner identifying the sender as a safe sender). The system then determines if the identified number of unique senders falls within a predetermined range ('z1'-'z2'), in step 108. The values for 'z1' and 'z2' may fluctuate according to the volume of saved messages in the user's mailbox. The values for 'z1' and 'z2' can be represented as either a percentage or an actual integer value. The values for 'z1' and 'z2' can be tiered depending on the total number of messages present in a user's mailbox. For example, by way of a non-limiting example of threshold values, if a user has been active within the system for a minimum of 3 years (x=3 years), has anywhere from 500-1000 (y=500-1000 saved messages) saved email messages in their mailbox and the number of unique sender email addresses out of the 500-1000 emails falls within the range of 7% to 10% (z1=7% and z2=10%), then the user's mailbox will have a trusted account set up within the spam detecting system. The specific values in these examples portray example values to determine minimum mailbox requirements to implement the system on the user's mailbox. The values are utilized to show sample embodiments of the system, and are by no means limiting examples of actual parameters the system can use. In yet another example, if the user has been active within the system for 5 years, has a pool of saved emails of 500-1000, and the number of unique sender email address is between 30-100, then the user's mailbox will have a trusted account set up within the spam detecting system. By way of a further non-limiting example and according to some embodiments of the present disclosure, if 500 messages of a user mailbox are saved email messages ('y'), and less than 20% ('z2') of those emails have unique addresses, then a trusted account may be established for the user mailbox.

By way of a non-limiting example and in some embodiments, the predetermined number of years of activity is at least three years. For example, if a typical user utilizing Yahoo! Mail has an average number of 80 contacts in their address book, and the predetermined range for unique senders is set at 50-350, then this average number would meet at least the system requirement. On the other hand, an account that has too many unique sender email addresses may already be storing spam. By way of a non-limiting example, on average, there can be an estimated 350 saved messages per email account. In some embodiments, about 60% of mail accounts have between 1-500 messages, 10% have 500-1000 messages and 10% have 1000-2000. The rest of the percentages are margined for error and inconsistent data. The data collected for the trusted account selection criteria may be collected in real-time or utilized by data mining techniques known to one with skill in the art. The predetermined values, 'x', 'y' and 'z1'-'z2' may be adjusted according to system requirements or message volume/frequency, user preferences, or any other factors weighing on an email system.

In embodiments the spam detecting system sets restrictions based on the number of trusted accounts to be set up for a location, step 110. The system identifies a predetermined number of trusted accounts for a geographical location based on the selection criteria discussed above. In some alternate embodiments, the trusted account pool size determination, step 110, may be skipped because the number of trusted accounts stored in the database may be a too small to warrant a limit to the size of stored trusted accounts. Alternatively, the pool size determination, step 110, may also be skipped because of the high volume of email traffic and density of population, i.e., New York City. For example, and in some embodiments, the spam detecting system may typically identify a predetermined amount of trusted accounts, 500-1000, for a major geographical location based on the selection criteria. Examples of geographical locations are: US, Europe, Taiwan/China, Latin America, or other countries, or may be limited to smaller areas: e.g., county, city, neighborhood, or other denominations of geographic space. Overall, the selection criteria can play a major factor in the spam detecting system and can be more or less emphasized by the system than the pool size. Upon satisfactory completion of these requirements, the information collected for a user's mailbox is stored in trusted account database (TAD) 112, as discussed in further detail below. If the email account that is being analyzed fails any of the selection criteria steps, the account is not be stored in the TAD. The user accounts that do not meet the spam detecting system selection criteria, may be subsequently analyzed again upon the next polling cycle or according to open storage space in the TAD, as in step 114. Thus the TAD is used to store statistically relevant user account information for use in analyzing incoming messages as spam, potential spam and/or not spam.

Figure 2:
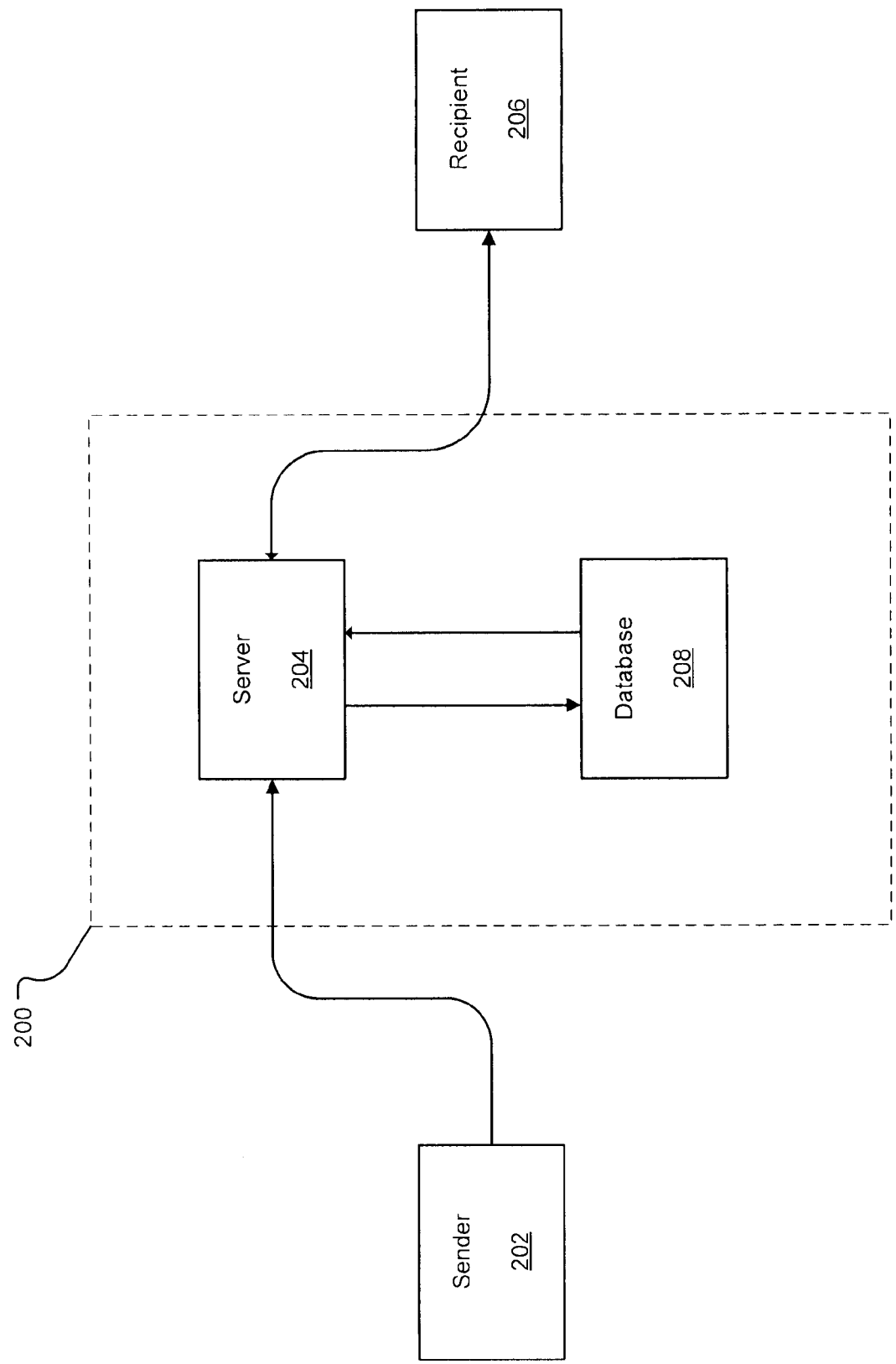
FIG. 2 is a schematic illustration of an embodiment of an architecture for facilitating an interaction between a sender and recipient during transmission of an email.

The spam detecting system can be implemented on a server or servers in a typical email environment between a plurality of users, as seen in FIG. 2. For simplicity of explanation, the spam detecting system 200 will be discussed, in an example, in the context of a typical communication between one sender 202 and one recipient 204. The implementation of FIG. 2 can be applied to a typical email environment of multiple senders and recipients. The spam detecting system 200 can be initially populated by an email server 204 analyzing a recipient's 206 email mailbox in accordance with the methods and techniques described herein. The mailbox contains information used for setting up a trusted account within the spam detecting system 200. The mailbox for a user must satisfy the selection criteria as discussed in connection with FIG. 1. Upon the server 204 receiving confirmation of satisfactory mailbox analysis based on the selection criteria for the recipient 206, the server 204 then sends the information to a TAD 208 for storage. In some embodiments, if the recipient 206 already has a trusted account stored in the TAD 208, the server 204 perform the selection criteria on the account in order to transmit updated mailbox records for storage. The system 200 may also perform the selection criteria on an existing account to ensure that the selection criteria is still met by the recipient's 206 mailbox. The updated records can include such information as an updated address book. The updated address book will provide an updated unique sender list for the user's mailbox.

Figure 5:
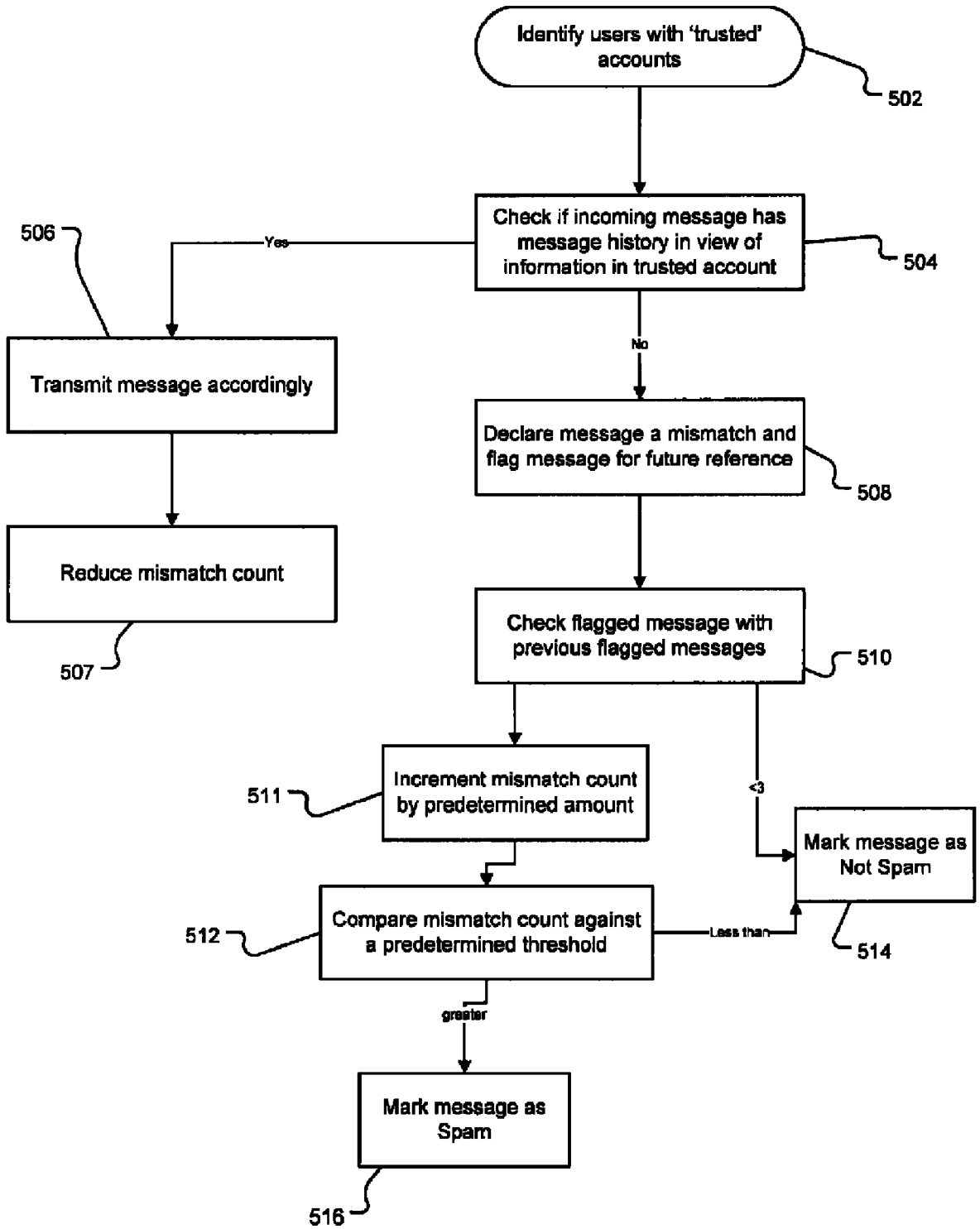
FIG. 5 is a flowchart illustrating one embodiment of method steps for determining spam.

When a sender 202 attempts to transmit an email message (or messages) over a network to a recipient 206, the message is routed through the email server 204. Such a network is known in the art, for example, the Internet, an internet, intranet, Wi-Fi, and/or any other communication network that facilitates transmission of data and connection between devices. The server 204 performs a check or scan of the TAD 208 for information relating to the sender's 202 email address that has been collected from the message to be transmitted. If the information relating to the sender's 202 email address is present in the trusted account for the recipient 206, then the sender is identified as trusted and the message is delivered accordingly. If the information is not present, then the sender is declared unknown. If the sender 202 is identified as trusted, then the message is safely transmitted to the intended mailbox of the recipient 206. If the message is identified as being sent from an unknown sender, a mismatch is declared for the message. When a mismatch occurs, the system 200 records the mismatch in the TAD 208. The system 200 tags the message as a potential spam, thereby recording the message body of the message for analysis with other messages. The system 200 may also analyze key contents of the message body. In some embodiments, the key contents of the message body may be keywords, subject, or any other type of distinguishing factor in the message used to identify the message. These contents are used to compare the incoming message with other messages marked as potential spam. If any of the key contents match a message tagged as potential spam, the system 200 will compare the incoming message's message body with that of other identified messages marked as a mismatch. The system 200 also can analyze each sender's 202 email address of the mismatch for potential spam with subsequent email messages that are identified as 'potential spam'. The system 200 tracks the total number of mismatches for each potential spam message. A mismatch count for both the message body and sender email address is maintained. The tracking of mismatches contributes to the determination of the probability a message is spam. According to an embodiment, the more distinct or unique a content match is, the higher the probability the message is spam. The analysis of a message body is linked with the analysis of the sender 202 and recipient 206 relationship, as discussed below in reference to FIG. 5.

Figure 3:
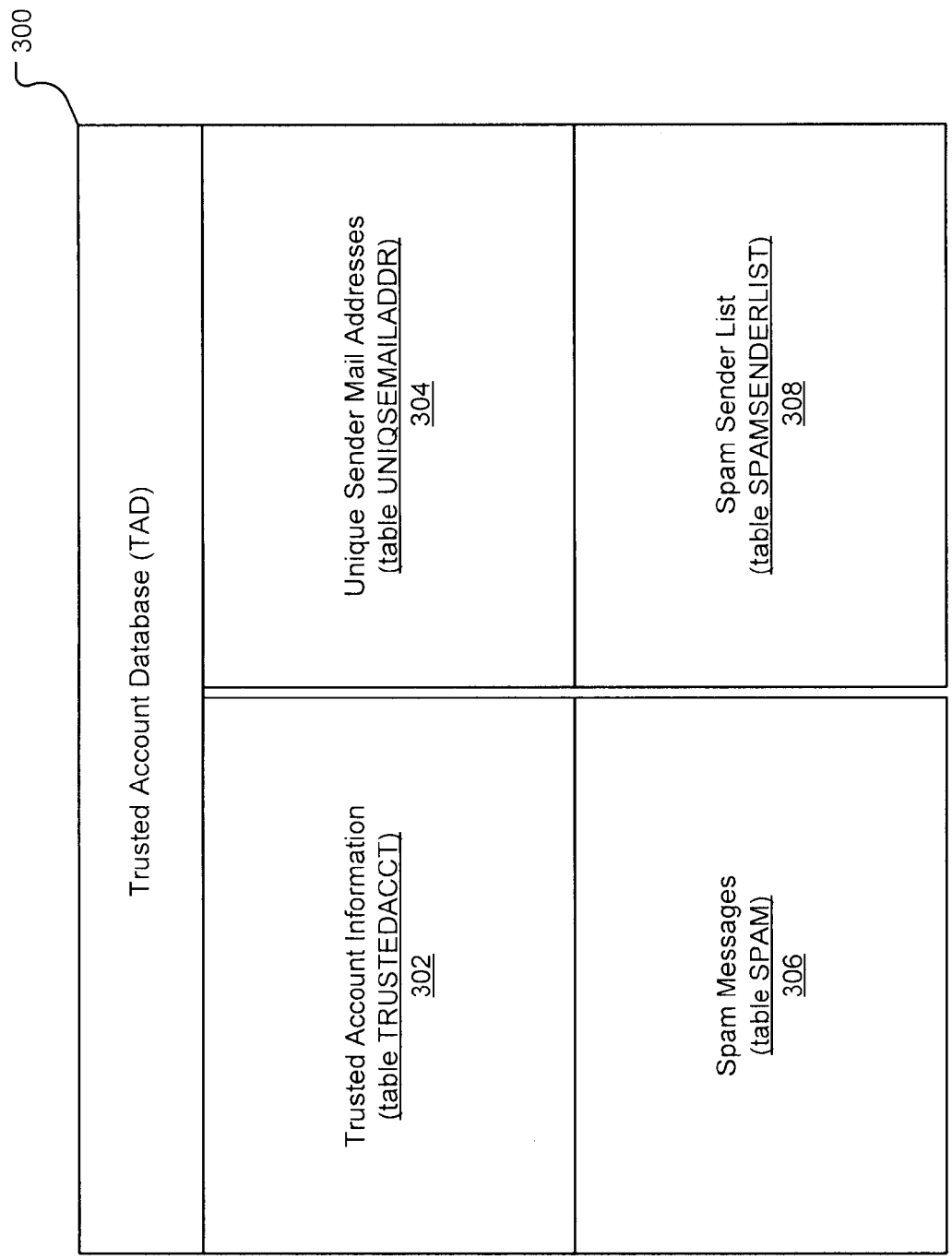
FIG. 3 is an embodiment of a Trusted Account Database (TAD) structure associated with an exchange server for storing information associated with transmissions of emails.

A trusted account for a user's mailbox and a user's email activity may be stored in a TAD, as seen in FIG. 3. The TAD 300 includes specific tables allocated for a user's trusted account. The TAD may embody the tables: trusted account information (table TRUSTFDACCT) 302, unique sender mail addresses (table UNIQSEMAILADDR) 304, spam messages (table SPAM) 306, and spam sender list for the senders' addresses (table SPAMSENDERLIST) 308. These tables provide organized storage for the information contained within a trusted account. The tables readily provide fast and cost effective methods for accessing the data for ease of transmission of mail messages and filtering of spam messages of course, the tables or data structures are contemplated, and can be used to perform the methods and features described herein.

The table for trusted account information (table TRUSTEDACCT) 302 within the TAD 300 includes such fields as an account ID for each user's account (acctID), number of messages (numMessages), and number of unique email addresses (numUniqEmailAddr). The table for unique sender mail addresses (table UNIQSEMAILADDR) 304 includes such fields as an account ID for each user's account (acctID), and a sender's email addresses for which the user whose account ID is present is the recipient (senderEmailAddress). The table for spam messages (table SPAM) 306 includes such fields as an account ID for each spam message (spamID), a redundancy check for a spam message or messages (checksum), the body of a specific message for each spamID (messageBody), a body mismatch value for variation of a spam message from the same sender (bodyMismatchCT), and a sender mismatch value for which the body of some messages are the same, but the senders' addresses are different (senderMismatchCT). According to some embodiments, there may be separate mismatch counts for different message bodies. The table for spam sender list for the senders' addresses (table SPAMSENDERLIST) 308 includes such fields as an account ID for each spam message (spamID), and the sender of the spam's email address (senderEmailAddr). The tables 302, 304, 306, 308 and fields may be populated by data mining techniques implemented on messages being transmitted over a network, and/or present in a user's mailbox. The tables 302, 304, 306, 308 and fields may also be populated by real-time analysis. All of the tables 302, 304, 306, 308 may have an expandable and/or retractable number of fields depending on the amount of data present in a user's mailbox.

The TAD 300 may be updated in real-time or periodically. The real-time updating can take place for each attempted message transmission. The TAD 300 may also be updated upon a change within a user's mailbox. A change in a user's mailbox can comprise the user deleting messages, receiving new messages, updating their address book, or any other typical behavior of a mailbox in an email environment. The TAD 300 may be updated periodically by polling the users in a network. The polling preferably takes place based upon a predetermined time period. The predetermined time period may be a period range set by either a user, a server or a system administrator. Herein, polling may be referred to as a system cronjob, which is a time-based scheduling service, which is known in the art. Prior to its implementation with an email server and the spam detecting system, the TAD 300 is empty. The spam detecting system may be implemented with an existing email system (i.e., Yahoo! Mail, GMail, HotMail, or any other known email system). During implementation of the spam detecting system, a new system cronjob runs the selection criteria. The selection criteria is utilized to populate the TAD 300. The criteria may be run in an order of importance, as follows in one example: account history, number of active messages, and number of unique sender email addresses. The selection criteria may be performed on all email accounts or until the pool size is reached, whichever happens first. If an email account meets the criteria, mailbox information will be added to the table TRUSTEDACCT 302 and UNIQSEMAILADDR 304. From this point, the TAD 300 will proceed to update the tables 302, 304, 306, 308 and fields accordingly based on email activity for each user mailbox having a trusted account.

In some embodiments, the TAD 300 may be updated by a system cronjob performed during predetermined time periods. For example, a time period of a cronjob may run at the end of each month. The cronjob performs the trusted account selection criteria on all existing trusted accounts. If an account is no longer qualified based on the selection criteria, it will be removed from table TRUSTEDACCT 302. If a predetermined number of trusted accounts no longer meet the selection criteria, the system cronjob performs checks on non-selected mail accounts to identify new candidates for storage in the TAD 300. The cronjob may be performed until a desired pool size is met. For example, if at least substantial number of the trusted accounts in the pool is no longer eligible, the spam detecting system will perform a cronjob on mailboxes of user accounts that do not have a trusted account set up. A marginal benefit can be experienced by a 100% filled pool compared to 90% filled pool, but this difference is not expected to be significant, so pool size can vary based on design choice or experience over time by human or machine learning. The pool of trusted accounts does not have to be full daily. For example, a monthly cronjob performed on the TAD 300 may be sufficient. In some alternative embodiments, the frequency of database cronjobs may either be more frequent or less frequent based on the pool size in the TAD 300.

In some alternative embodiments, when the spam detecting system identifies messages of a mailbox utilizing the spam detecting system, a metadata field of each mailbox may be expanded to enable storage for information relating to account history, number of active messages and number of unique sender email addresses (i.e., selection criteria parameters). For example, in Yahoo! Mail, a header (i.e., "miscellaneous header") may be expanded to incorporate this subject matter. In other email programs, a typical metadata field for a similar mailbox would be expanded to store the information in order to implement the spam detecting system locally. In this embodiment, the system may just scan or run a system cronjob on the metadata field, rather than the entire mailbox.

Figure 4:
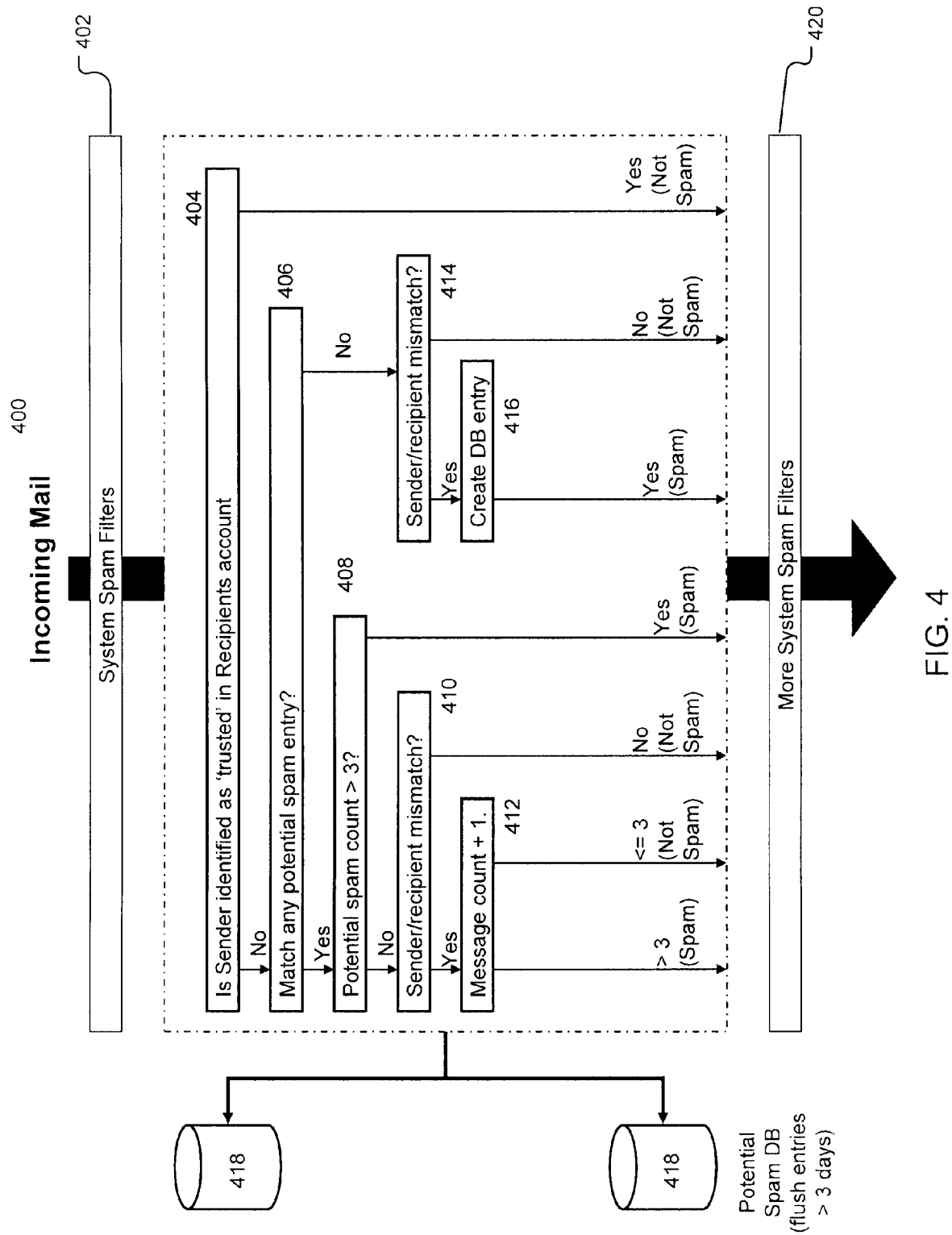
FIG. 4 is an illustration of one embodiment of steps for determining spam from an incoming email message.

When an email message is transmitted for delivery to a recipient, the message will be filtered by at least one spam filter implemented by a server. The filters can be implemented by the spam detecting system 200 of FIG. 2. As shown in FIG. 4, a spam filter system 400 analyzes incoming email messages and determines whether the messages are spam. According to some embodiments, the spam filter system 400 is implemented on a server. In some embodiments, any number of databases (TADs) 418 can be implemented for storage of information collected during the filtering of email messages. The spam filter system 400 analyzes each incoming email message. The message body and sender email address of each message are preferably analyzed because a spam email may be sent from different email addresses. Also, an email address can send different spam emails. Upon detecting an incoming email message, the message is filtered through a spam filter 402. In some alternative embodiments, a plurality of spam filters 402 may be implemented due to the volume of messages, either simultaneously (incorporated in 402) or sequentially after each filter's analysis, as in step 420. The spam filter 402 performs a check on the incoming message to determine if the email sender can be identified as trusted by the recipient's account, as in step 404. If the sender's email address of the mail message is present in the recipient's address book, the message is identified as 'Not Spam' and is transmitted to the recipient. If sender's email address is not identified in the recipient's trusted account, a checksum is calculated on the message body which checks if the message body matches that of other identified potential spam messages, step 406. A checksum is understood as one of many various techniques that can be implemented to match emails against existing potential spam messages. If the message body does not match any previous potential spam entry, the contents of the message (i.e., sender's email address) are checked for a mismatch in view of other or previous identified potential spam messages, as in step 414. If the checksum of the message content does not match any existing entries in table SPAM, email is marked "Not Spam". If a match does appear between any of the contents of the incoming message and other identified potential spam messages, then a database entry is created in TAD under the table SPAM (for a message body match) and/or under the table SPAMSENDERLIST (for an sender email address match), as in step 416.

Following step 406, if the checksum of the message results in a match between the incoming message and an existing potential spam entry stored in table SPAM, the message body is compared against a body mismatch count, step 408. The body mismatch count, bodyMismatchCT. is a counter that is incremented and decremented for each message marked as unknown. There can be a separate bodyMismatchCT for each type of message body type that contains unique context within each message body. In some embodiments, if any portion of the content of a message matches a previously identified potential spam message, the message may be identified as spam; therefore, that particular mismatch count will be incremented. If there is no match between a new message and a previously identified potential spam message, then the new message is assigned its own mismatch count. The mismatch count is tallied against a predetermined mismatch threshold. The mismatch threshold represents the probability that a message is spam. If the mismatch count for a particular message is equal to or greater than (or just greater than) the threshold, then the message will be marked as spam. If the count is less than (or equal to or less than) the threshold, the message will still be identified as potential spam, but the message will be transmitted nonetheless. The message can be transmitted to an allocated mailbox folder within a recipients account which notifies the recipient that there is a chance that the message may be spam (or harmful), as will be discussed in FIG. 6. The spam filter system 400 also has mismatch count for senders emails (senderMismatchCT). The sender mismatch count analysis proceeds according to the same protocol of the body mismatch count. In some embodiments, the sender mismatch count is calculated after the message body is checked for mismatches. The sender mismatch count is based on the matching identity of a sender's email address.

Continuing with the present example, if the mismatch count for a particular message body type is greater than the threshold, then the message is marked as spam, step 408. The predetermined mismatch threshold serves as an indicator that an email message containing a specific type of message body can be identified as spam. In some embodiments the predetermined mismatch threshold for a mismatch count is 3. If the mismatch count does not exceed the predetermined mismatch threshold, a similar mismatch analysis may be performed on the message content, including a sender's email address, against other identified potential spam messages as in step 414, step 410. If the checksum analysis between potential spam messages and the incoming message's content does not produce a match, then the message is "Not Spam". Yet, since the incoming message was marked as unknown, a new mismatch count is assigned to the message, for future reference against future incoming messages. If there is a match from the comparison of step 410 corresponding to the incoming messages content (sender address), then the mismatch count is incremented by 1, as in step 412. If the mismatch count is less than or equal to the predetermined threshold after the incrementation of the mismatch count, then the message is "Not Spam". If the mismatch count is greater than a predetermined threshold count after step 412, then the message is marked as spam. Either the system, user or administrator may have authority to set the predetermined threshold count for a mismatch count for each email system as a matter of choice in accordance with the techniques herein. For example, if email address is not in table UNIQSEMAILADDR, an entry for this email is added to table SPAM, then increment the mismatch count by 1 (step 412). In some embodiments, and by way of a non-limiting example, when the filter system 400 receives an incoming message, if the incoming message's email address does not match any in table UNIQEMAILADDR, the senderMismatchCT is incremented by 1. If a senderMismatchCT is greater than 3, the message is marked as "Spam" and the sender may be marked as a spammer.

In some embodiments, table SPAM and table SPAM-SENDERLIST are flushed every periodically from the database 418. In some embodiments, this period of time for flushing the TAD 418 can be as short as three days. As known in the art, spam email usually varies daily, if not hourly. In some embodiments, for example, it is understood that the pool of trusted accounts can be very small, whereby the total number of trusted accounts 100×10 major areas=1000, which is less than 0.0025% of total active email users (250 Million) in the world, therefore, the period of flushing the database 418, may be even smaller.

As used in the example depicted in FIG. 4, a value of 3 or higher can be used as a threshold corresponding to a mismatch count. The threshold value may be a predetermined value determined by the spam detecting system or other governing entity within or utilizing the system. The higher the number used, the higher the chance a message is a spam when the count is reached. For example, an email that reaches at least three randomly selected trusted accounts within a period of three days and its sender email address is not in the address books of all recipients has a high probability of being spam.

The spam filter system 400 of FIG. 4 provides identification analysis of incoming mail messages based upon the relationship between a sender and a recipient. The relationship between the sender and the recipient is based upon the status of the sender's email address being present in a recipient's trusted account within the TAD, as discussed in connection with FIG. 5. The spam detecting system identifies a list of trusted accounts through analysis of the selection criteria, step 502. (As discussed above in connection with FIG. 1). When an incoming message's sender's email address is checked for presence in a trusted account, the system checks if the sender's email address is among the identified unique senders in this account, step 504. If the sender's address matches one of the unique senders in the recipient's account, the message is cleared as not spam and is transmitted to the appropriate mailbox of the recipient, step 506. In some alternative embodiments, if a message that was previously marked as potential spam or spam is transmitted from a sender that is identified as safe according to a recipient's trusted account, the mismatch count for that message will be decremented, step 507. If the sender's email address is not present in the recipient's trusted account, a mismatch will be declared and flagged for future reference in view of other future incoming messages that are declared a mismatch, step 508. When a message is flagged, the message will be remembered as a "potential spam" and certain appropriate portions of the message may be retained and stored in the TAD to identify similar or identical future messages. The system can also remember the email address as one of the senders generating this mismatch for this message. In some embodiments, there may be two mismatch counts, one for message body mismatches, and one for address mismatches. These two mismatch counts can be performed simultaneously, sequentially, or alternatively.

The system then compares the contents of the incoming messages with that of previously identified "potential spam" messages, step 510. If the contents do not match, then the message can be marked or flagged as "Not Spam", step 514. When the message produces a match with previous email messages flagged as "potential spam", the system will increment the associated mismatch count for the message by a predetermined amount, step 511. In some embodiments, the predetermined amount will be one. The system will then compare the tally of the mismatch count against the predetermined threshold for identifying messages as spam, as in step 512. If the total number of "mismatches" has not exceeded the pre-determined threshold, the message is marked as "Not Spam", step 514. If the total number of "mismatches" exceeds a pre-determined number, the message will be marked as spam, as in step 516. Furthermore, in another non-limiting example, if the same message is sent to more than 3 different "trusted" accounts from more than one sender not existing in the sender list of these accounts, especially three different senders, it is highly likely that this message is a spam. In some embodiments, if the total number of "mismatches" has not exceeded the pre-determined number, but the number of mismatches associated to a sender exceeds a pre-determined threshold, the system can trigger other anti-spam techniques to analyze further.

As just one advantage of the system, the sender/recipient relationship represented by trusted accounts can be difficult for spammers to figure out. Even in the event that a spammer successfully builds a few accounts with good history to get these accounts into trusted state, it cannot be done in a short amount of time, and the system will have enough opportunity to sort these types of users out and expose them as spammers.

Figure 6:
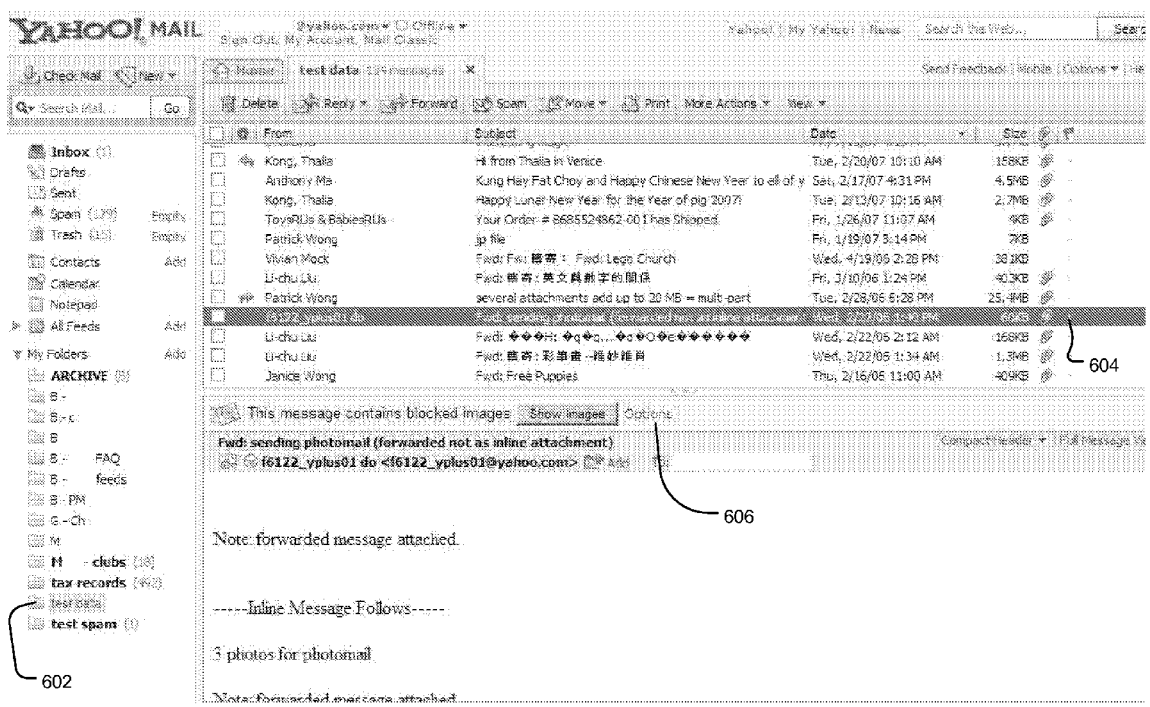
FIG. 6 is an example of one embodiment of a user interface showing an email message in a mailbox where the sender's email address is not in the recipient's address book.

FIG. 6 is an example of a the result of an incoming message 604 being marked as a mismatch. In some embodiments, all of the addresses in a recipient's address book will be marked as safe and stored in the TAD as a unique address under table UNIQSEMAILADDR. In this example of FIG. 6, the sender's address was a mismatch but the mismatch count was below the threshold, therefore the message was not marked as spam. In some embodiments, when this occurs, the message can be delivered but not completely. The downloadable material, or content not relating to text may not be delivered. The contents of the message can retained at the server to identify similar or identical future messages. In this example, the folder 'test data' 602 is set as the potential spam folder, therefore, the message was sent there awaiting action by the user under the 'options button'. The options button 606 provides the user the opportunity to either delete the message, identify the message and/or sender as safe or take other action necessary to protect the user's system. This enables the recipient to be aware of communications over a network and further identify safe and/or unsafe messages and/or senders. The user also has the opportunity to download the images if the user deems the message as safe despite the system's suspicions.

Figure 7:
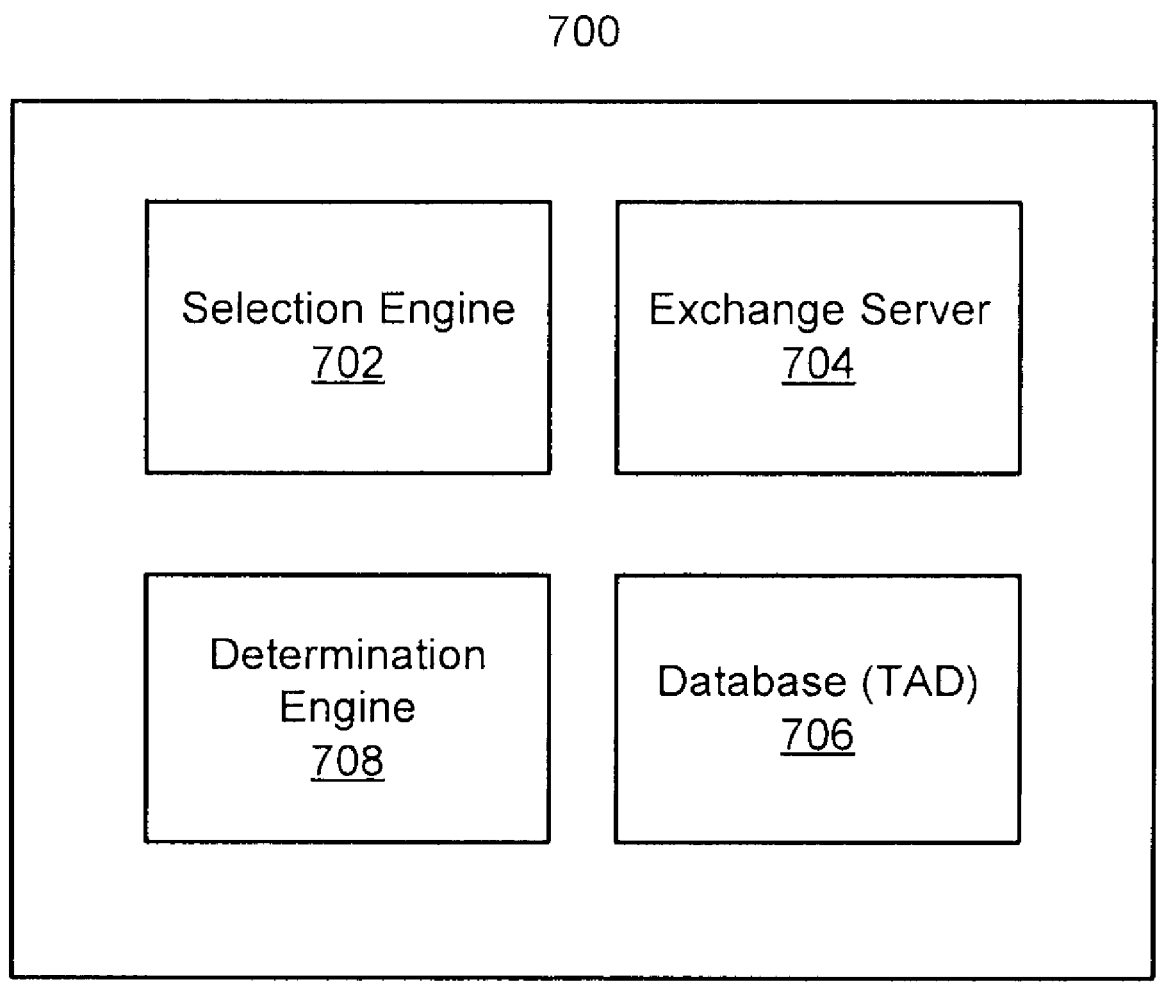
FIG. 7 illustrates one embodiment of the system components of a spam detecting system.

As discussed above, the spam system 200 of FIG. 2 is the backbone of the spam detecting method and system, as shown in FIG. 7. The spam system 700 (spam system 200 from FIG. 2) includes an email server 704, database (TAD) 706, a selection engine 702 and a determination engine 708. The TAD 706 provides storage for information corresponding to potential spam emails (message body and sender address) in view of unique recipient mailbox accounts, as discussed above. The TAD 706 can be external or internal to the server 704. If the TAD 702 is external, a virtual system may be implied, in that direct, real-time, and/or unrestricted communication occurs between the server 704 and the TAD 702. The TAD 702 may be external to the system to provide enhanced security of the information stored within, and/or to provide excess storage as a multitude of databases may make up the TAD 702. The server 704 provides a channel for communication between a recipient and sender to transmit messages over a network, which is known in the art. The selection engine 702 provides analysis management of the system 700 corresponding to the trusted account selection criteria calculations, trusted account pool size calculations and population of the TAD 706, as discussed above. The determination engine 708 provides the analysis management of the system 700 for determining if a message is spam or not, and further determinations of mismatches, as discussed above. A recipient (user with account within the system 700) may have the ability to mark senders and/or messages as not spammers or spam based on options and/or preference settings incorporated in an existing email environment by the spam detecting system 700.

By way of a non-limiting example, a user (U1) has an account within the spam detecting system whereby U1 has been active in the system for 6 years and have accumulated between 1500-2000 saved emails. More than 5% and less than 15% of those emails are unique senders have email addresses identified as safe (i.e., present in U1's address book). For this example, those figures satisfy the selection criteria. The spam detecting system has a fully populated and updated TAD for each user, especially U1. Upon the system identifying an email that is unknown (i.e., sender's email address not in U1's address book), the system analyzes the incoming message and sender address (S1). Since S1 does not match U1's account data, the system identifies the message as potential spam. The message content is compared against other messages marked as potential spam. In this example, the message does not match any other potential spam message, therefore the mismatch count for the message is below the threshold to identify a message as spam. In this example, the threshold is 3, which represents three occurrences of a message attempting to be transmitted by marked as being from an unknown sender. The message may be subsequently delivered, but with limited data content so that U1 has the option to either download the information, and/or put the address in their address book so that S1 is identified as trusted. U1 may also choose to discard based on the limited content or not recognizing the sender. The system may also retain corresponding message content so that for future reference, it may compare the message content/body and sender address against future emails. Since, in this example, S1 is a spammer, the message is repeatedly sent and filtered by the system. The mismatch count for message eventually exceeds the threshold value, therefore, the message is identified as spam. S1's address is validly identified as a spammer in regard to U1. In some alternative embodiments, if the system identifies a sender as a spammer or a message as spam, the identification will carry over to all users who implement the spam detecting system; therefore, limiting system resources in computing the probability that a message is spam, and increasing the efficiency of the entire system.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. Numerous other changes may be made that will readily suggest themselves to those skilled in the art and which are encompassed in the spirit of the disclosure(s) disclosed.

What is claimed is:

1. A method comprising:

receiving in a messaging application an electronic message from a sender, the message comprising a message body and a sender address, the message identifying a recipient;

identifying the recipient as having a trusted account with a service provider, the account being identified in a trusted database, the account identifying a plurality of sender addresses as being trusted;

determining whether the sender address is a trusted sender address by determining if the sender address is identified as trusted in the recipient's trusted account;

upon the determination that the sender address is not identified as a trusted sender, identifying the message as potential spam;

comparing the message body of the message with a message body of each of a corpus of existing messages in the database that are identified as potential spam;

determining if a match exists between the message body of the message and at least one message body of the existing messages;

if a match exists, incrementing a message body match counter, the message body match counter tallying a total number of determined matches;

comparing the counter's value with a predetermined threshold value, the predetermined threshold value indicating a probability of a message being spam; and identifying the message as spam based on the comparison.

2. The method of claim 1, wherein if the message counter value is greater than the predetermined threshold value, identifying the message as spam.

3. The method of claim 1, wherein if the message counter value is equal to or greater than the predetermined threshold value, identifying the message as spam.

4. The method of claim 1, further comprising:
if the message body match counter value is less than the predetermined threshold value, maintaining the message as potential spam.

5. The method of claim 1, further comprising:
if the message body match counter value is less than the predetermined threshold value, delivering the message to the recipient, the delivery of the message being transmitted along with an indication that the message is identified as potential spam.

6. The method of claim 1, further comprising:
upon determining the sender address being a trusted sender address, transmitting the message to the recipient, the message being identified as not spam.

7. The method of claim 1, further comprising:
upon the determination that the sender address is not a trusted sender address, incrementing a sender address match counter, the sender address match counter tallying a total number of identified potential spam messages transmitted from a specific sender's address.

8. The method of claim 7, wherein if the sender address match counter value is greater than the predetermined threshold value, identifying the message as spam.

9. The method of claim 7, wherein if the sender address match counter value is equal to or greater than the predetermined threshold value, identifying the message as spam.

10. The method of claim 7, further comprising:
if the sender address match counter value is less than the predetermined threshold value, maintaining the message as potential spam, and
delivering the message to the recipient, the message being transmitted along with an indication that the message is being sent from a potential spammer.

11. The method of claim 1, wherein for each identified potential spam message having a unique message body, there exists a unique message body match counter.

12. The method of claim 7, wherein for each unique sender address not identified as being a trusted sender address, there exists a separate sender address match counter.

13. The method of claim 1, wherein the sender and the recipient are users within an email system, the users having a mailbox comprising messages.

14. The method of claim 1, wherein said identifying the recipient as having a trusted account comprises:
identifying a user from a plurality of users, the plurality of users running the messaging application, the plurality of users all having a mailbox;
determining if the user's mailbox satisfies a selection criteria, the selection criteria identifying required activity of the user's mailbox, the selection criteria comprises:
determining whether the mailbox has been active for at least a predetermined time period;
determining whether the mailbox comprises at least a predetermined number of messages; and
determining whether the messages comprise a number of unique senders being within a predetermined range, the predetermined range being a portion of the number of messages; and
creating the trusted account for the user's mailbox; and
storing the account in the trusted database based upon the user's mailbox satisfying all the selection criteria requirements.

15. The method of claim 14, further comprising:
if the user's mailbox fails to meet at least one of the selection criteria, a trusted account is not created for the user's mailbox.

16. The method of claim 14, further comprising
populating an account pool with a portion of the plurality of users, the portion of users having satisfied the selection criteria, the account pool being limited to a predetermined range of users based upon location.

17. The method of claim 14, wherein said storing is performed based upon a predetermined polling cycle in order to populate the database; and
wherein said storing is based on space available in the database.

18. The method of claim 14, wherein the unique senders are identified in an address book in the user's mailbox.

19. A computer-readable medium tangibly encoded with instructions for performing a method comprising:
receiving in a messaging application an electronic message from a sender, the message comprising a message body and a sender address, the message identifying a recipient;
identifying the recipient as having a trusted account with a service provider, the account being identified in a trusted database, the account identifying a plurality of sender addresses as being trusted;
determining whether the sender address is a trusted sender address by determining if the sender address is identified as trusted in the recipient's trusted account;
upon the determination that the sender address is not identified as a trusted sender, identifying the message as potential spam;
comparing the message body of the message with a message body of each of a corpus of existing messages in the database that are identified as potential spam;
determining if a match exists between the message body of the message and at least one message body of the existing messages;
if a match exists, incrementing a message body match counter, the message body match counter tallying a total number of determined matches;
comparing the counter's value with a predetermined threshold value, the predetermined threshold value indicating a probability of a message being spam; and
identifying the message as spam based on the comparison.

20. The computer-readable medium of claim 19, wherein if the message counter value is greater than the predetermined threshold value, identifying the message as spam.

21. The computer-readable medium of claim 19, wherein if the message counter value is equal to or greater than the predetermined threshold value, identifying the message as spam.

22. The computer-readable medium of claim 19, further comprising:
if the message body match counter value is less than the predetermined threshold value, maintaining the message as potential spam.

23. The computer-readable medium of claim 19, further comprising:
if the message body match counter value is less than the predetermined threshold value, delivering the message to the recipient, the delivery of the message being transmitted along with an indication that the message is identified as potential spam.

24. The computer-readable medium of claim 19, further comprising:
upon determining the sender address being a trusted sender address, transmitting the message to the recipient, the message being identified as not spam.

25. The computer-readable medium of claim 19, further comprising:
upon the determination that the sender address is not a trusted sender address, incrementing a sender address match counter, the sender address match counter tallying a total number of identified potential spam messages transmitted from a specific sender's address.

26. The computer-readable medium of claim 25, wherein if the sender address match counter value is greater than the predetermined threshold value, identifying the message as spam.

27. The computer-readable medium of claim 25, wherein if the sender address match counter value is equal to or greater than the predetermined threshold value, identifying the message as spam.

28. The computer-readable medium of claim 25, further comprising:
if the sender address match counter value is less than the predetermined threshold value, maintaining the message as potential spam, and
delivering the message to the recipient, the message being transmitted along with an indication that the message is being sent from a potential spammer.

29. The computer-readable medium of claim 19, wherein for each identified potential spam message having a unique message body, there exists a unique message body match counter.

30. The computer-readable medium of claim 25, wherein for each unique sender address not identified as being a trusted sender address, there exists a separate sender address match counter.

31. The computer-readable medium of claim 19, wherein the sender and the recipient are users within an email system, the users having a mailbox comprising messages.

32. The computer-readable medium of claim 19, wherein said identifying the recipient as having a trusted account comprises:
identifying a user from a plurality of users, the plurality of users running the messaging application, the plurality of users all having a mailbox;
determining if the user's mailbox satisfies a selection criteria, the selection criteria identifying required activity of the user's mailbox, the selection criteria comprises:
determining whether the mailbox has been active for at least a predetermined time period;
determining whether the mailbox comprises at least a predetermined number of messages; and
determining whether the messages comprise a number of unique senders being within a predetermined range, the predetermined range being a portion of the number of messages; and
creating the trusted account for the user's mailbox; and
storing the account in the trusted database based upon the user's mailbox satisfying all the selection criteria requirements.

33. The computer-readable medium of claim 32, further comprising:
if the user's mailbox fails to meet at least one of the selection criteria, a trusted account is not created for the user's mailbox.

34. The computer-readable medium of claim 32, further comprising
populating an account pool with a portion of the plurality of users, the portion of users having satisfied the selection criteria, the account pool being limited to a predetermined range of users based upon location.

35. The computer-readable medium of claim 32, wherein said storing is performed based upon a predetermined polling cycle in order to populate the database; and
wherein said storing is based on space available in the database.

36. The computer-readable medium of claim 32, wherein the unique senders are identified in an address book in the user's mailbox.

37. A system comprising:
a plurality of processors;
a server for receiving an electronic message from a sender, the message comprising a message body and a sender address, the message identifying a recipient;
a selection engine implemented on one of the plurality of processors for identifying the recipient as having a trusted account identified in a trusted database, the account identifying a plurality of sender addresses as being trusted;
a determination engine implemented on one of the plurality of processors for determining whether the sender address is an identified trusted sender address in the recipient's trusted account, wherein if the sender address is not identified as a trusted sender, the message is identified as potential spam;
the determination engine configured for comparing the message body of the message with a message body of each of a corpus of existing messages in the database that are identified as potential spam, wherein if a match exists between the message body of the message and at least one message body of the existing messages, a message body match counter is incremented;
the determination engine configured for comparing the counter's value with a predetermined threshold value, the predetermined threshold value indicating a probability of a message being spam; and
the determination engine configured for identifying the message as spam based on the comparison.

38. The system of claim 37, further comprising:
the server, upon the determination engine determining the sender address being a trusted sender address, transmitting the message to the recipient, the message being identified as not spam.

39. The system of claim 37, further comprising:
the selection engine identifying the recipient as running a messaging application, the recipient having a mailbox within said messaging application;
the selection engine determining if the recipient's mailbox satisfies a selection criteria, the selection engine performing the steps comprising:
determining whether the mailbox has been active for at least a predetermined time period;
determining whether the mailbox comprises at least a predetermined number of messages; and
determining whether the messages comprise a number of unique senders being within a predetermined range, the predetermined range being a portion of the number of messages; and
the selection engine creating the trusted account for the user's mailbox; and
the selection engine storing the account in the trusted database based upon the user's mailbox satisfying all the selection criteria requirements.

40. The system of claim 39, further comprising:
the selection engine populating an account pool with a plurality of users, the portion of users having satisfied the selection criteria, the account pool being limited to a predetermined range of users based upon location.

* * * * *